(12) United States Patent
Bursell

(10) Patent No.: US 8,639,928 B2
(45) Date of Patent: Jan. 28, 2014

(54) SYSTEM AND METHOD FOR MOUNTING ENCRYPTED DATA BASED ON AVAILABILITY OF A KEY ON A NETWORK

(75) Inventor: Michael Hingston McLaughlin Bursell, Halstead (GB)

(73) Assignee: Certicom Corp., Mississauga (CA)

( * ) Notice: Subject to any disclaimer, the term of this patent is extended or adjusted under 35 U.S.C. 154(b) by 8 days.

(21) Appl. No.: 13/311,238

(22) Filed: Dec. 5, 2011

(65) Prior Publication Data

US 2013/0145160 A1  Jun. 6, 2013

(51) Int. Cl.
*H04L 29/06* (2006.01)
*H04L 9/32* (2006.01)
*G06F 11/30* (2006.01)
*G06F 12/14* (2006.01)

(52) U.S. Cl.
USPC ............... 713/168; 713/155; 713/193; 726/2; 380/270; 380/286

(58) Field of Classification Search
None
See application file for complete search history.

(56) References Cited

U.S. PATENT DOCUMENTS

| | | | | |
|---|---|---|---|---|
| 5,495,533 | A | * | 2/1996 | Linehan et al. ............... 713/155 |
| 7,596,696 | B1 | | 9/2009 | Perlman |
| 7,711,122 | B2 | * | 5/2010 | Allen et al. ................... 380/286 |
| 7,957,532 | B2 | | 6/2011 | Chen et al. |
| 8,005,227 | B1 | | 8/2011 | Linnell et al. |
| 2003/0051159 | A1 | | 3/2003 | McCown et al. |
| 2004/0236958 | A1 | | 11/2004 | Teicher et al. |
| 2007/0297610 | A1 | * | 12/2007 | Chen et al. ..................... 380/270 |
| 2008/0077808 | A1 | * | 3/2008 | Teicher et al. ................. 713/193 |
| 2010/0008509 | A1 | | 1/2010 | Matsushita et al. |
| 2010/0199106 | A1 | | 8/2010 | Iida |
| 2010/0232604 | A1 | | 9/2010 | Eklund, II |
| 2012/0192250 | A1 | * | 7/2012 | Rakan ............................. 726/2 |

OTHER PUBLICATIONS

European Search mailed May 29, 2012 in corresponding EP Application No. EP11191993.2.
Menezes, A. J. et al.; Chapter 10: Identification and Entity Authentication ED; Handbook of Applied Cryptography; CRC Press Series on Discreet Mathematics and its Applications; Oct. 1, 1996; pp. 385-424; XP001525010; Boca Raton, FL, US. URL: http://www.cacr.math.uwaterloo.ca/hac.

* cited by examiner

*Primary Examiner* — Shin-Hon Chen
(74) *Attorney, Agent, or Firm* — Novak Druce Connolly Bove + Quigg LLP

(57) ABSTRACT

A system and a method are provided for retrieving decryption keys from a secure location that is separate from the encrypted data. In particular, for each decryption key, there is an associated key ID, public and private authentication key pair and a storage key. The decryption key is encrypted and can be decrypted with the storage key. A key-server securely stores the encrypted decryption key, key ID and public authentication key. A separate key-host stores the storage key, key ID and private authentication key. For the key-host to retrieve the encrypted decryption key, the key-server first authenticates the key-host using the authentication keys. Upon receipt of the encrypted decryption key, the key-host decrypts the encrypted key using the storage key. The decryption key is then used for decrypting the encrypted data.

26 Claims, 13 Drawing Sheets

SYSTEM AND METHOD FOR MOUNTING ENCRYPTED DATA BASED ON AVAILABILITY OF A KEY ON A NETWORK

TECHNICAL FIELD

The following relates generally to mounting data in cryptographic systems.

DESCRIPTION OF THE RELATED ART

It is growing industry practice to encrypt hard-drives of computing devices to aid with protecting data from access by unauthorized users. Some computing devices, such as laptops or servers that operate in non-secure environments (e.g. a manufacturing floor), are subject to theft.

By way of background the contents of memory devices, data partitions, files and software applications, which are of a sensitive nature, are typically encrypted. Such encrypted data are normally decrypted with a key. Therefore, a user or system cannot access the encrypted devices or read data unless the decryption key is available.

BRIEF DESCRIPTION OF THE DRAWINGS

Embodiments will now be described by way of example only with reference to the accompanying drawings wherein.

DETAILED DESCRIPTION

Figure 1:
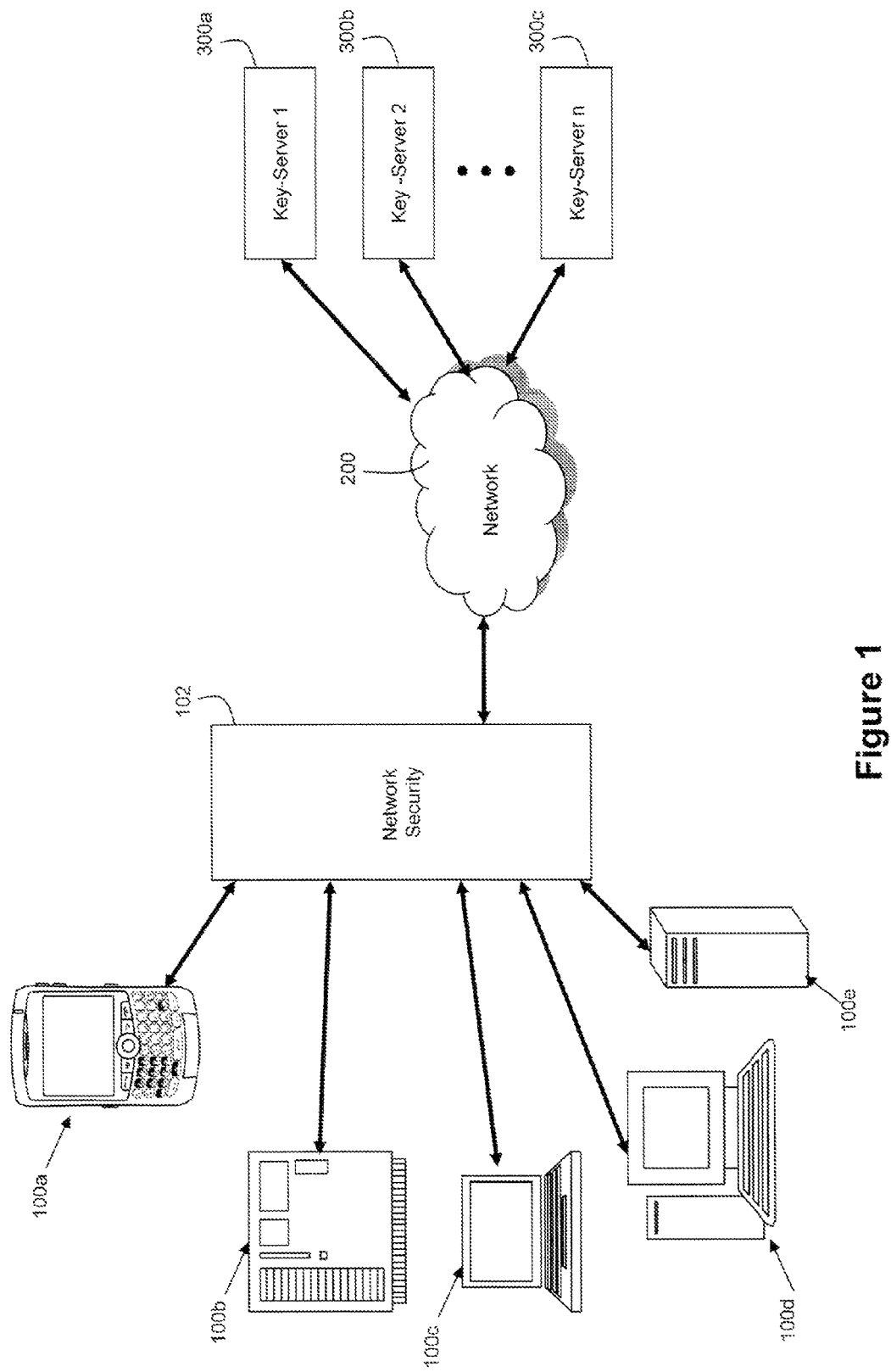
FIG. 1 is a schematic block diagram of several key-hosts in communication with several key-servers.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art and having the benefit of the present disclosure that the embodiments described herein may be practiced without these specific details. In other instances, well-known methods, procedures and components have not been described in detail so as not to obscure the embodiments described herein. Also, the description is not to be considered as limiting the scope of the embodiments described herein.

Data may be encrypted and later decrypted using a decryption key. Storing the decryption key in a secure manner can be difficult. If, for example, a computing device's data file is encrypted, and the decryption key is stored on the computing device, then the encrypted data file may be vulnerable to attack if an attacker steals the entire computing device. The attacker may be able to access to the decryption key and may decrypt the encrypted data file. To reduce access to the decryption key, in an example aspect of the proposed systems and methods, the decryption key is not stored directly on the computing device.

In some computing devices, a trusted user loads a decryption key, for example at boot time, to decrypt the encrypted devices or data. Employing a trusted user to carry out this task may not be feasible or economical for computing devices, for example desktop computers or servers, that are regarded as low maintenance. The task of manually loading a decryption key may become more challenging when there are multiple encrypted devices and data partitions that need to be each decrypted with a separate decryption key within a short time period.

Decryption keys are also stored on hardware security modules (HSMs) to protect such keys. HSMs may not be economical or appropriate for all computing devices. An HSM may also be vulnerable to attack if the computing device and attached HSM are stolen while the HSM is still active. In such a case, an attacker may be able to access the decryption keys stored on the HSM and decrypt the memory devices or data stored thereon.

In these cases, it can be difficult to secure devices or data which resides in such a way that it will not be vulnerable in the case of theft.

In general, an example system and method include a first computing device that has a processor for generating a decryption key and for encrypting a decryption key, such that it can be decrypted with a storage key. The storage key, as well as a key ID and a private authentication key associated with the decryption key, are stored on the first computing device's memory. The encrypted decryption key is sent to a second computing device's memory for storage, in addition to a copy of the key ID and a public authentication key that corresponds to the private authentication key. The second computing device also has a processor for authenticating the first computing device using the private and public authentication keys. After the second computing device has authenticated the first computing device, it sends the encrypted decryption key to the first computing device, thereby allowing the first computing device to decrypt the encrypted data using the storage key.

In general, an example method is provided for encrypting and decrypting data on a device. The method includes: encrypting data stored on the device, the encrypted data able to be decrypted with a decryption key stored on the device; encrypting the decryption key, the encrypted decryption key able to be decrypted with a storage key, the storage key stored on the device; transmitting the encrypted decryption key from the device, the transmission configured to be receivable by a key-server for storage; deleting the encrypted decryption key and the decryption key from the device; retrieving the encrypted decryption key from a received transmission from the key-server; decrypting the encrypted decryption key using the storage key to obtain the decryption key; and, using the decryption key for decrypting the encrypted data.

In another example aspect, the device is in communication with the key-server via a network security system. In another example aspect, the method further comprises the device generating a key ID in association with the decryption key and the storage key, the key ID transmitted to the key-server along with the encrypted decryption key. In another example aspect, the method further comprises the device generating a key ID, a private authentication key, and a public authentication key, wherein the key ID and the public authentication key are transmitted to the key-server along with the encrypted decryption key. In another example aspect, the method further comprises: the device establishing a secure connection with the key-server; the device receiving a nonce from the key-server; encrypting the nonce and the key ID using the private key, and the device transmitting the encrypted nonce and key ID in a transmission configured to be receivable by the key-server as a request for the encrypted storage key; and, the device receiving a next transmission from the key-server, the next transmission indicating the key-server verified the request. In another example aspect, the method further comprises: after the device uses the decryption key to decrypt the encrypted data, deleting the decryption key and the encrypted decryption key. In another example aspect, the method further comprises: after the device deleting the decryption key and the encrypted decryption key, generating a new decryption key; encrypting the new decryption key, the encrypted new decryption key able to be decrypted with the storage key; transmitting the encrypted new decryption key from said device in a transmission configured to be receivable by said key-server for storage; and, after re-encrypting the data, the re-encrypted data able to be decrypted using the new decryption key, deleting the encrypted decryption key and the decryption key from the device. In another example aspect, the method further comprises: at periodic times, the device generating a new decryption key; re-encrypting the data, the re-encrypted data able to be decrypted with the new decryption key; encrypting the new decryption key, the encrypted new decryption key able to be decrypted with the storage key; transmitting the encrypted decryption key from the device to the key-server; and, deleting the new decryption key and the encrypted decryption key from the device.

In another example aspect, the encrypted data is able to be decrypted with multiple decryption keys stored on the device, and the method further comprises: encrypting the multiple decryption keys, the multiple encrypted decryption keys able to be decrypted with corresponding multiple storage keys, the multiple storage keys stored on the device; transmitting the multiple encrypted decryption keys from the device, the transmission configured to be receivable by multiple key-servers for storage; deleting the multiple encrypted decryption keys and the multiple decryption key from the device; retrieving the multiple encrypted decryption keys from a received transmission from each of the multiple key-servers; decrypting the multiple encrypted decryption keys using the multiple storage keys to obtain the multiple decryption keys; and, using the multiple decryption keys for decrypting the encrypted data. In another example aspect, the method further comprises the device generating multiple key-server tags, each one of the multiple key-server tags in association with one of the multiple decryption keys and one of the multiple storage keys, each one of the multiple key-server tags used to identify which one of the multiple key-servers stores a particular decryption key. In another example aspect, the method further comprises using the multiple key-server tags to contact the multiple key-servers to retrieve the multiple encrypted decryption keys.

In general, an example method is provided for storing encrypted decryption keys on a key-server. The method includes: the key-server receiving in a first reception, a first key ID, a public authentication key and an encrypted decryption key being able to be decrypted from a storage key, the first reception configured to be transmittable by a key-host; the key-server storing the first key ID, the public authentication key and the encrypted decryption key in association with one another; the key-server receiving a request from a received transmission from the key-host to obtain the encrypted decryption key; the key-server generating and transmitting a first nonce, the first nonce configured to be transmittable to the key-host; the key-server receiving in a second reception, an encryption of a second nonce and a second key ID, the reception configured to be transmittable by the key-host, the encryption performed using a private authentication key corresponding to the public authentication key; the key-server decrypting the encryption using the public authentication key; verifying that the second key ID matches the first key ID and the second nonce matches the first nonce; and, the key-server transmitting the encrypted decryption key to the key-host.

In another example aspect, the device and the key-host are able to communicate with one another via a network security system.

Turning to FIG. 1, several key-hosts, generally represented by reference numeral 100, are shown connected to a network 200 via a network security system or network security device 102. Key-hosts 100 can be any type of computing device, such as a mobile device 100*a*, manufacturing computer 100*b*, laptop 100*c*, desktop computer 100*d* and server 100*e*, each of which is generically referred to as a key-host 100. The key-hosts 100 can communicate through the network 200 to one or more key-servers 300*a*, 300*b*, 300*c*, wherein the key-server is generally represented by reference numeral 300.

Figure 2:
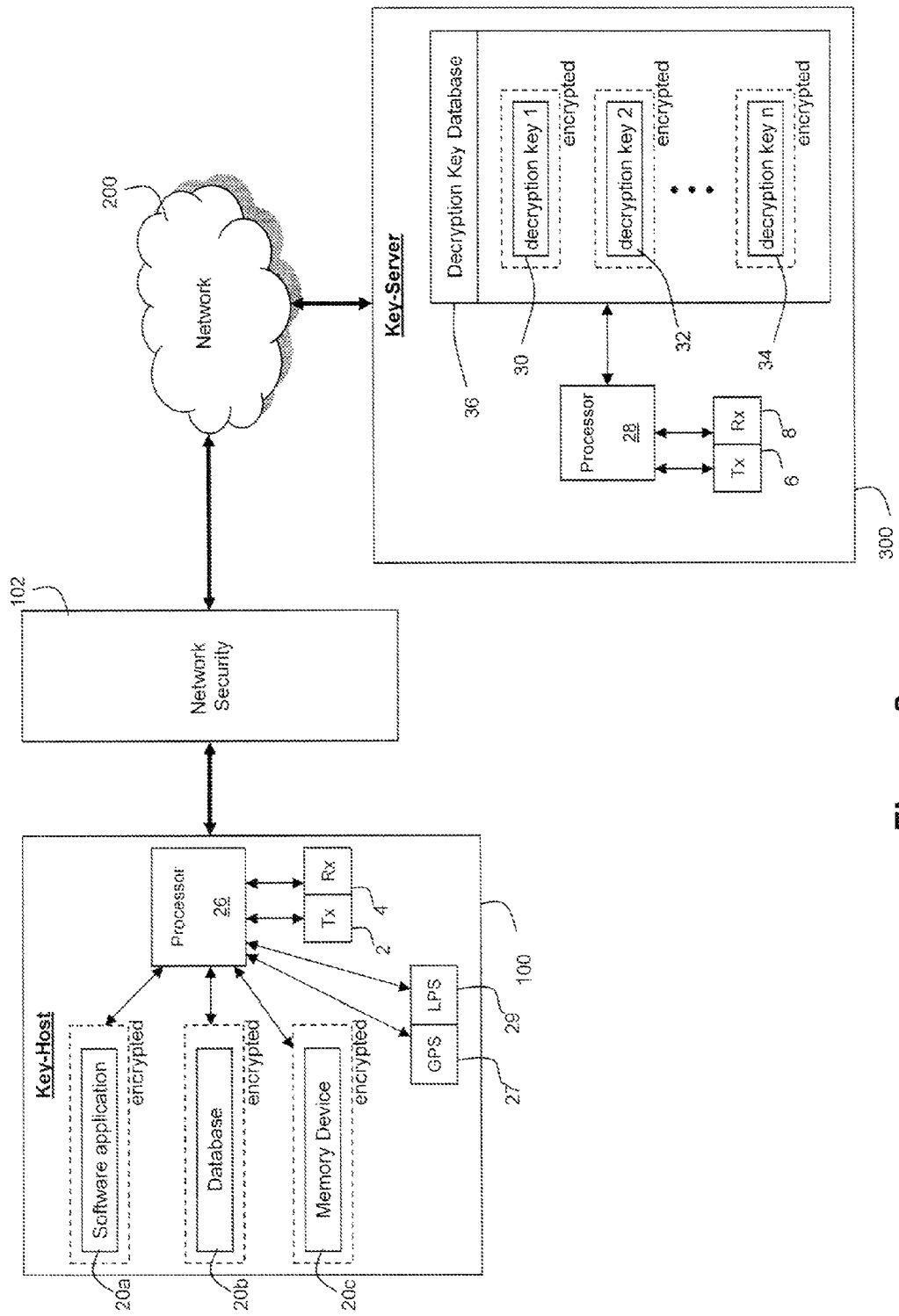
FIG. 2 is a schematic block diagram of a key-host in communication with a key-server showing example components therein.

As can be best seen in FIG. 2, a key-host 100 has a processor 26 to execute computer readable instructions, as required in response to inputs. The processor 26 interfaces with a memory 20 to store data and instructions. The memory 20 is partitioned into various forms of data 20 represented by the suffixes 'a', 'b' and so forth some or all of which may be encrypted. For example, a memory device 20*c*, such as a hard-drive, may be encrypted in its entirety or alternately, some data partitions within a memory device 20*c* are encrypted, while other data partitions within the same memory device 20*c* are not encrypted. In this way, sensitive data may be securely stored in the encrypted data partitions. Similarly, a database 20*b* within a computing device's memory may also be encrypted, such that a user can freely access various parts of the key-host 100 while only requiring a decryption key to access the encrypted database 20*b*. Further, software applications 20*a* may be encrypted, such that various functions cannot be performed without a decryption key.

As shown in more detail in FIG. 2, the key-host 100 also has a transceiver 2 and receiver 4 for sending and receiving data. The key-host 100 sends and receives data through a network 200, as illustrated with dotted lines. The key-host 100 establishes a secure communication with the network 200 through the network security system 102. The network 200 is any type of system for allowing two or more computing devices to communicate with one another. Examples of a network 200 include wide area networks, local area networks, mobile networks, wireless networks, Ethernet networks, fibre optic networks, Bluetooth™ networks, peer-to-peer networks, the Internet and virtual private networks. It may be that one computing device may connect to another computing device directly, for example via a data cable or infrared communicator, in which case the network 200 and the other computing device are the same.

The network security system 102 prevents unauthorized access (including logical access or physical access, or both) to the network 200 and any means to that end are applicable to the principles herein. The network security system 102 provides, for example, logical security. For example, access through the logical security is controlled using passwords, hardware IDs, encryption keys, digital signatures, or combinations thereof. For example, the network security system 102 may comprise a computer or network firewall and may be used to implement authentication schemes. In another example, the network security system 102 may include physical security hardware. This, for example, may comprise a secure building with locked doors, wherein the access point to the network 200 is inside the secure building. Thus, in such an example, for a key-host 100 to have authorized access to the network 200, it must be physically located inside the secure building. In another example embodiment, the network security system 102 includes a combination of physical security hardware and logical security measures.

In an example of a home environment, a user may securely connect a laptop 100c to a home's wireless network 200 by physically locating the laptop 100c close enough to the wireless router, and providing a password. The network security system 102 can also be used to prevent unauthorized access to an Internet access point, for example, through encryption schemes or physical measures from accessing the Internet access point. It can be appreciated that various approaches to the network security system 102 may be implemented depending on the overall system.

In another example embodiment, continuing with FIG. 2, the key-host 100 includes a Global Positioning System (GPS) device 27 or a Local Positioning System (LPS) device 29, or both. It can be appreciated that GPS can also include assisted GPS (e.g. A-GPS or aGPS), in which data from a network is used to more quickly acquire satellites, or more quickly calculate position, or both. Non-limiting examples of an LPS device 29 include devices that interact with cellular base stations, wireless access points, radio broadcast towers, or any combination thereof, to determine a position of the key-host 100. The LPS device 29 may also include a Near Field Communication (NFC) device. The GPS device 27 or the LPS device 29, or both, may be used in combination with the network security system 102. For example, position information from the GPS device 27 or the LPS device 29, or both, are used to determine if the key-host 100 is located within a certain area. Position information, for example, can include location coordinates. For example, the key-host 100 sends its position information to the network security system 102. The position information, for example, can be part of a digital signature from the key-host 100. If the key-host 100 is not located within the certain area, then the network security system 102 denies the key-host 100 from accessing the key-server 300. If the key-host 100 is located within the certain area and, for example, if other security conditions are satisfied, the network security system 102 provides the key-host 100 access to the key-server 300. In other words, in an example embodiment, the encrypted data on the key-host 100 can be accessed if the key-host 100 is located within a certain physical area.

The key-host 100 has authorized access to the network 200 upon meeting the conditions of the network security system 102. The key-host 100 may then interact with a key-server 300 via the network 200.

The key-server 300 is a computing device with a processor 28 to execute computer readable instructions. The key-server 300 may, for example, be secured physically and logically. For example, the key-server 300 may be a bastion host. A bastion host generally refers to a special purpose computer, or group of computers, on a network specifically designed and configured to withstand attacks. The computer or computers generally, although not necessarily, host a single application, for example a proxy server, and all other services are removed or limited to reduce the threat to the computer. It is hardened in this manner primarily due to its location and purpose, which is either on the outside of the firewall or in the "demilitarized zone", as known in computer security, and can involve access from untrusted networks or computers. Similar to the key-host 100, the key-server 300 also has a transceiver 6 and receiver 8 for exchanging data, for example with the network 200. A decryption key database 36 resides within the memory of the key-server 300. The key-server 300 uses the processor 28 to store and retrieve decryption keys 30, 32, 34 from the decryption key database 36. The decryption keys 30, 32, 34 include decryption keys, Km, that are used to decrypt encrypted data 20 in the key-host 100. The decryption keys Km are stored on the key-server 300 in an encrypted form. Thus, only authorized users or entities would be able to decrypt an encrypted decryption key Km. The key-server 300 does not store any of the decryption keys in an unencrypted form, nor does it have the ability to decrypt the encrypted decryption keys. With such conditions, if a key-server 300 is compromised, then the encrypted decryption keys stored therein cannot be readily used by an attacker. In an example embodiment, only an authenticated key-host 100 can access and decrypt the encrypted decryption keys, as described further below.

Turning back to FIG. 1, it can be seen that multiple key-servers 300a, 300b, 300c may be connected to the network 200. Moreover, any number of key-hosts 100a, 100b, 200c, 100d, 100e may interact with one or more of the key-servers 300a, 300b, 300c. In some example situations, the encrypted decryption keys may be stored across multiple key-servers 300 in order to reduce the coupling between security risk and a particular key-server 300. Distributing the encrypted decryption keys across multiple key-servers 300 reduces the risk, should one of the key-servers 300 be compromised. In another example embodiment, encrypted decryption keys are stored across multiple key-servers 300 to address the situation when a key-server becomes unavailable. For example, if a key-host 100 is not able to communicate with or reach a key-server, then the key-host will not be able to obtain the encrypted decryption key. By storing one or more copies of the encrypted decryption key across multiple key-servers, if one of the key-servers is not available, the key-host is able to contact another key-server that stores a copy of the encrypted decryption key. The key-host can then obtain the copy of the encrypted decryption key.

Figure 3:
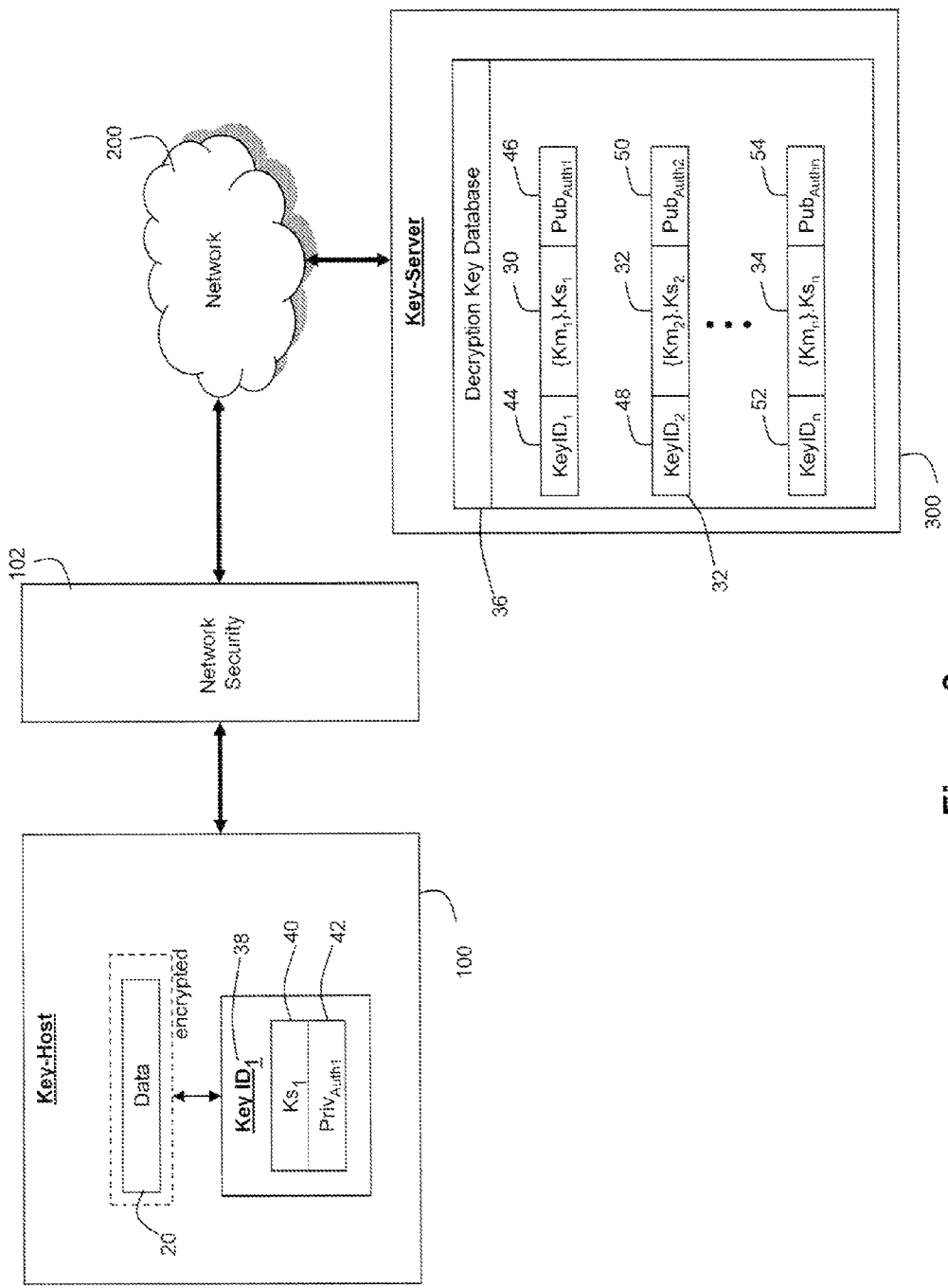
FIG. 3 is another schematic block diagram of the key-host and the key-server of FIG. 2 showing example components therein.

Turning to FIG. 3, to enable data on the key-host 100 to be retrieved, the key-host 100 stores the encrypted data 20 and has associated therewith a key ID 38, a storage key (Ks) 40 and a private authentication or signing key (PrivAuth) 42. The data 20 is encrypted such that in can be decrypted by decryption key Km, and can be represented by the expression {data}.Km. The key ID 38 identifies the decryption key (Km) that corresponds with the encrypted data 20. The storage key 40 is used to decrypt the encrypted decryption key. The private authentication key 42 is used to authenticate the key-host 100 before the key-server 300. It can be appreciated that for each encrypted data module 20, there may be associated a different decryption key, a different key ID 38, a different storage key 40 and a different private authentication key 42. In an example embodiment, the key ID 38, storage key and authentication key are unique. In another example embodiment, this data may not be unique. This, for example, may be allowed if there is a large enough variation and number in the key sets.

Continuing with FIG. 3, on the key-server 300 each decryption key Km is encrypted such that it can be decrypted by a corresponding storage key Ks. This relationship is represented by the expression {Km}.Ks. Each encrypted decryption key {Km}.Ks has associated therewith a key ID and public authorization key ($Pub_{Auth}$), which are stored together in a decryption key database 36 on the key-server 300. The public authorization key is used to verify a private authorization key 42, provided by a key-host 100. As shown in FIG. 3, $KeyID_1$, $\{Km_1\}.Ks_1$ and $Pub_{Auth1}$ are stored together on the key-server 300 and are associated with one another as represented by the subscript "1". Similarly, $KeyID_2$, $\{Km_2\}.Ks_2$ and $Pub_{Auth2}$ are associated with one another, and $KeyID_n$, $\{Km_n\}.Ks_n$ and $Pub_{Authn}$ are associated with one another.

It can be seen that the key-server 300 does not store unencrypted key Km, nor does it store the storage key Ks. The key-host 100 does not normally store the encrypted decryption key {Km}.Ks nor the decryption key Km. The physical separation of the decryption key from the encrypted data makes it difficult for an attacker to decrypt the encrypted data 20, should either the key-host 100 or key-server 300 be compromised. As will be discussed further below, in an example embodiment, the key-host 100 promptly deletes the encrypted decryption key or decryption key, or both, after use.

It will be appreciated that any module or component exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the key-host 100 or key-server 300, or accessible or connectable thereto. Any application or module herein described may be implemented using computer readable/executable instructions or operations that may be stored or otherwise held by such computer readable media.

Figure 4:
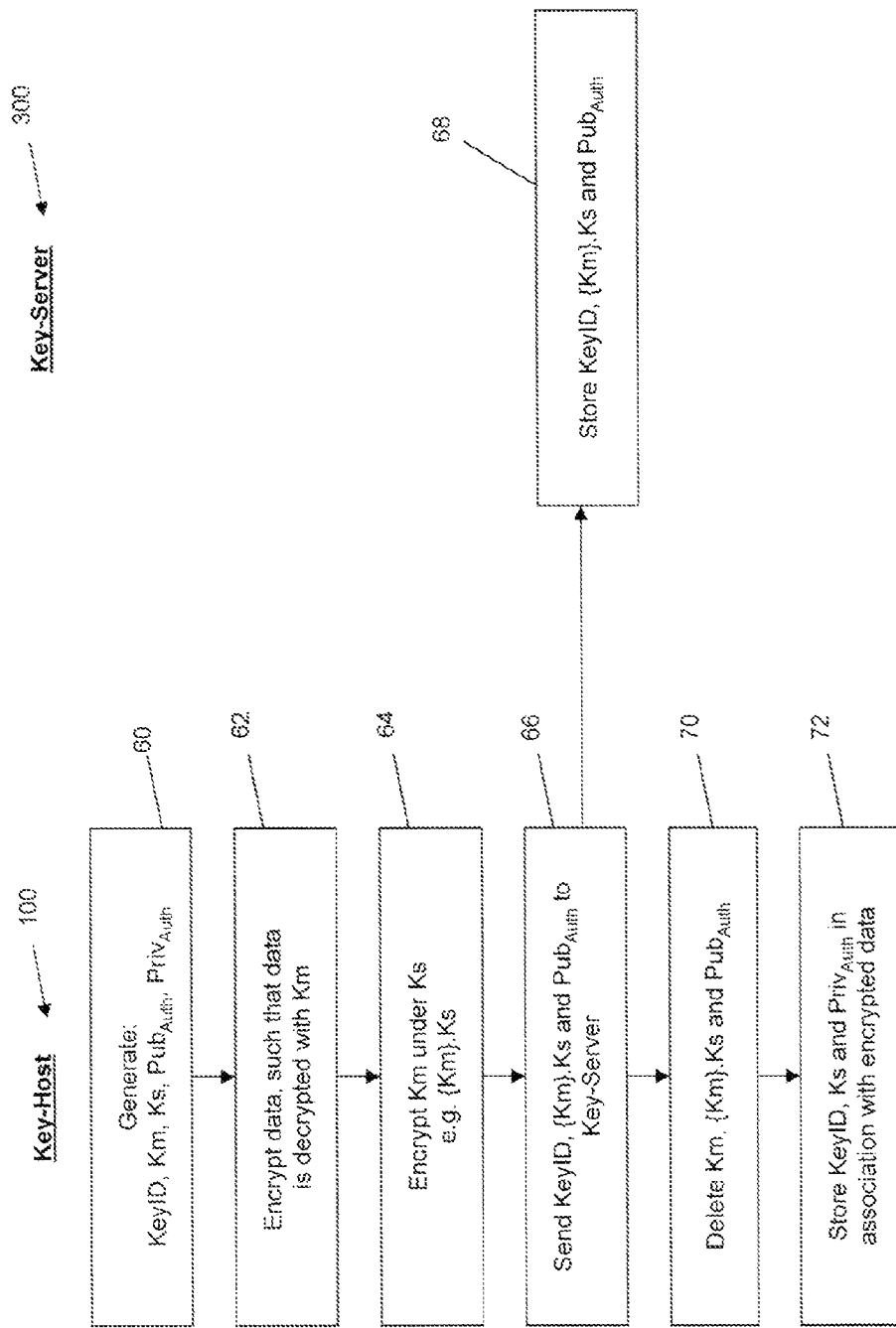
FIG. 4 is a flow diagram illustrating a process for storing a decryption key between a key-host and a key-server.

In FIG. 4, an example flow diagram representing computer executable instructions for generating and distributing the keys between the key-host 100 and key-server 300 is provided. At block 60, the key-host 100 generates the key ID, decryption key Km, storage key Ks, and corresponding public and private authentication keys ($Pub_{Auth}$ and $Priv_{Auth}$). The generation of these keys may use any of the known cryptographic schemes. For example, the key ID and the decryption key Km may be random data strings or cryptographic hashes of random data strings, and the private and public keys may be an elliptic curve key pair so that the private key is a random integer k and the public key corresponds to point kp. Alternatively, the encryption key and decryption key may be a public/private key pair, such as a discrete log crypto system key pair x, $\alpha^x$ or the elliptic curve analog X, Xp. Similarly, the storage key Ks may be a data string or part of a key pair.

At block 62, the key-host 100 encrypts the data 20, such that the encrypted data 20 can be decrypted with the decryption key Km. The data may be XOR'd with the data string or with one of the key pairs to provide the encrypted data 20. Non-limiting examples of encryption techniques include public key cryptography schemes, wherein in an asymmetric key encryption scheme, anyone can encrypt messages using the public key, but only the holder of the paired private key can decrypt. Security of the message depends on the secrecy of that private key. The private key, for example, can be the decryption key Km. It is intended that any encryption method compatible with the present disclosure may be used here, including those that may be known but not listed to a person of skill in this art who has the benefit of the present disclosure. The encrypted data is represented by {data}.Km.

Then, at block 64, the key-host encrypts the decryption key Km using Ks and is represented by {Km}.Ks. In other words, the encrypted key {Km}.Ks can be decrypted by Ks. When the key-host 100 is securely connected to the network 200 and is in communication with the key-server 300, the key-host 100 sends the key ID, encrypted decryption key and public authentication key to the key-server 300, at block 66. Upon receiving this data, the key-server 300, at block 68, stores the key ID, encrypted decryption key and public authentication key into its memory in the decryption key database 36.

At block 70, the key-host 100, for example, deletes any instances of the encryption key, decryption key and encrypted decryption key from its memory. The key-host 100 may also delete instances of the corresponding public authentication key from its memory.

At block 72, the key-host 100 stores the key ID, storage key and private authentication key in its memory, with a link to the encrypted data 20. It can be appreciated that this process of generation, encryption, transmittal and storage of keys results in the distribution of keys and data shown in FIG. 3.

Figure 5:
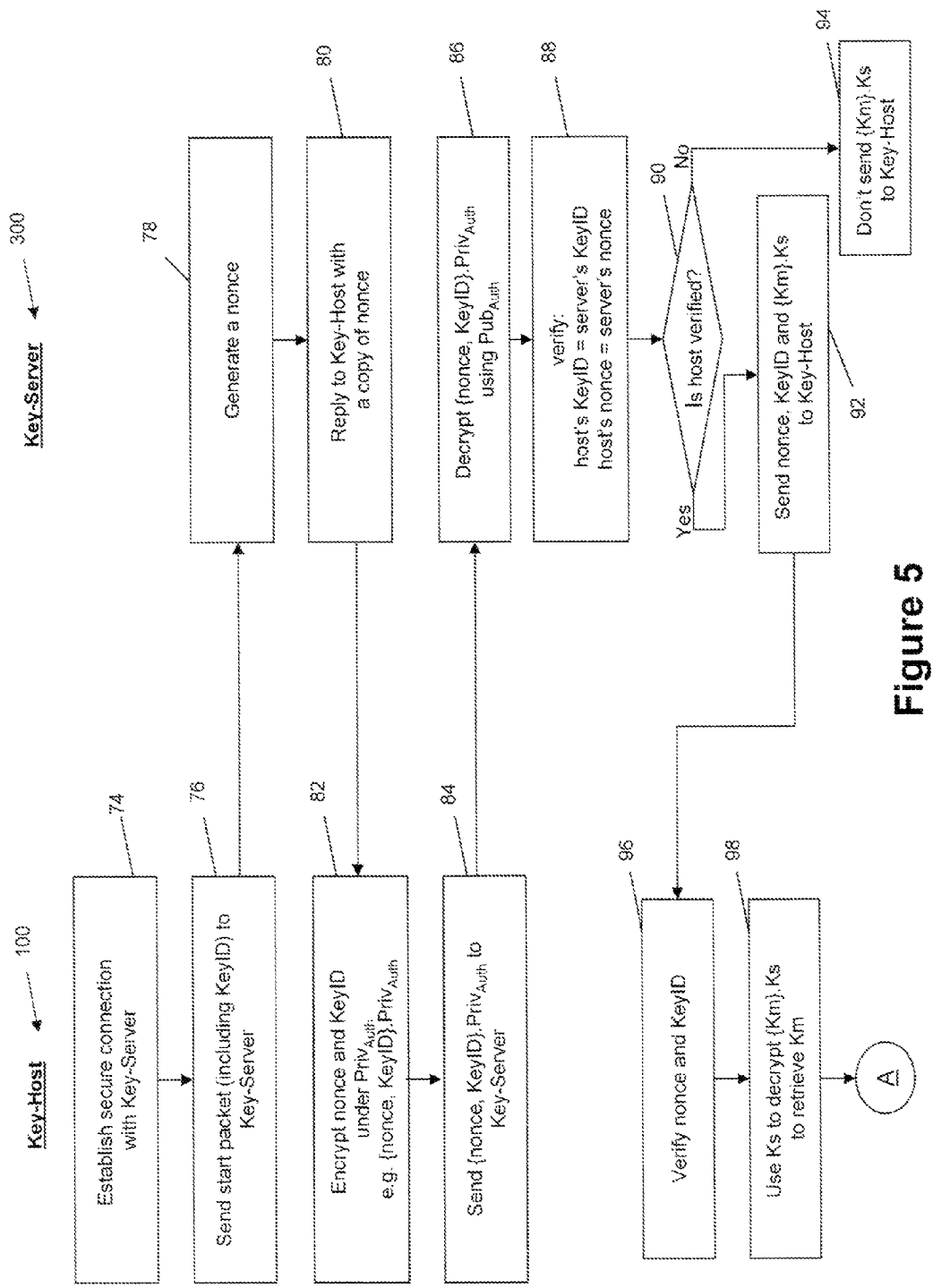
FIG. 5 is a flow diagram illustrating a process for a key-host to retrieve a decryption key from a key-server.

In FIG. 5, an example flow diagram representing example computer executable instructions for a key-host 100 to retrieve a decryption key from a key-server 300 is provided. The decryption key is retrieved in order to decrypt the encrypted data 20. If not already done, at block 74, the key-host 100 establishes a secure connection with the key-server 300, which involves meeting the conditions of the network security system 102. As discussed above, the conditions of the network security system 102 may vary, depending on the type of network security system 102 (e.g. logical security, physical security, location-based security, firewall-security, etc.). After a secure connection is established, at block 76, the key-host 100 sends a start packet of data to the key-server 300 to establish communication. The start-packet may also include the key ID of the decryption key Km, which the key-host 100 desires to retrieve. Upon receiving the start-packet, at block 78, the key-server 300 generates a nonce, which is a random or pseudo-random number used to identify the present communication session between the key-host 100 and key-server 300. The nonce can be used to avoid or identify replay attacks. At block 80, the key-server 300 replies to the key-host 100 and sends a copy of the nonce to the key host 100.

After receiving the nonce, at block 82, the key-host 100 cryptographically signs the nonce and key ID using the private authentication key, wherein the signed message is represented by {nonce, key ID}.Priv$_{Auth}$. The key-host 100 sends this signed message to the key-server at block 84. The key-server 300 uses the key ID, as provided by the key-host 100, to select the associated public authentication key from the decryption key database 36. Then, in block 86, the key-server verifies the message to authenticate {nonce, key ID}.Priv$_{Auth}$ using the public authentication key. If the key-host's request is authenticated, then the key-server 300 proceeds to compare and verify that the key-host's copy of the key ID and nonce are the same as the key-server's copy of the key ID and nonce, as per blocks 88 and 90. If the key-host's and key-server's copies of the key ID and nonce are the same, at block 92, the key-server 300 sends the nonce, key ID and corresponding encrypted decryption key to the key-host 100. If the key-host 100 is not verified at block 90, then at block 94 the key-server does not send the encrypted decryption key to the key-host 100.

Upon the key-host's receipt of the nonce, key ID and encrypted decryption key, the key-host 100, at block 96, verifies the nonce and key ID (e.g. compares received nonce and key ID with previous instances of nonce and key ID). If the key ID and nonce are verified, then the key-host 100, at block 98, uses the storage key to decrypt the encrypted decryption key, thereby retrieving the decryption key Km.

It can be appreciated that the authentication schemes and encryption and decryption schemes compatible with the present disclosure may be used here, including those that may be known but not listed to a person of skill in this art who has the benefit of the present disclosure. Examples of authentication schemes include RSA, DSA and ECDSA. Examples of encryption and decryption schemes include RSA, and MQV and ECMQV key agreement.

It can also be appreciated that the method for a key-host 100 to retrieve a decryption key from a key-server 300 does not require a nonce but may use other mutual authentication techniques.

Figure 6:
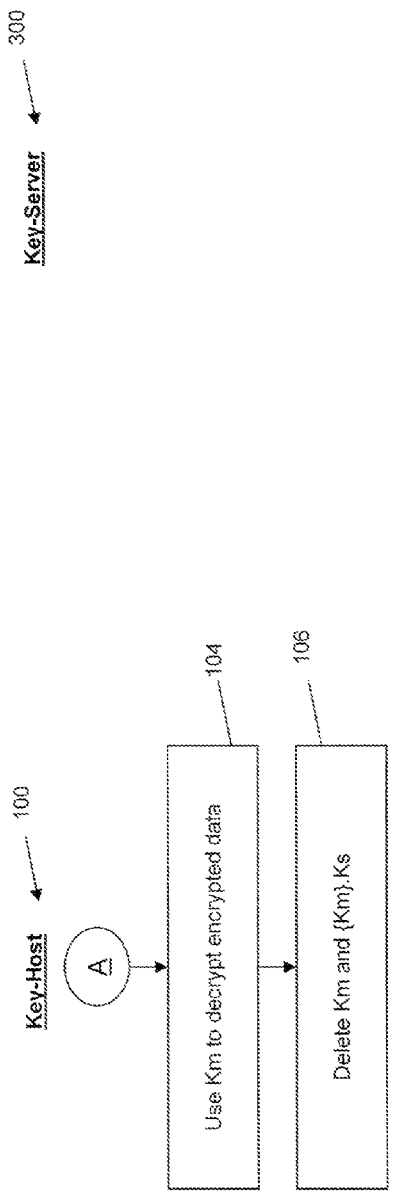
FIG. 6 is a flow diagram illustrating a continued part of the process in FIG. 5 for deleting the decryption key.

Turning to FIG. 6, in continuation from block 98 in FIG. 5, the key-host 100 uses the decryption key to decrypt the encrypted data {data}.Km, as per block 104. After decrypting the data 20, the key-host 100 deletes the decryption key Km and encrypted decryption key {Km}.Ks from its memory. By doing so, an attacker would not be able to retrieve the decryption key from the key-host 100.

It can thus be seen that by storing the decryption keys in a secure location that is separate from the encrypted data 20 advantageously centralizes the security organization. For example, only the key-servers 300 need to be extensively secured. Thus, resources directed to security, such as the network security system 102, can be focused on controlling access to the key-server 300. This provides significant savings with respect to physical security and maintenance.

Figure 7:
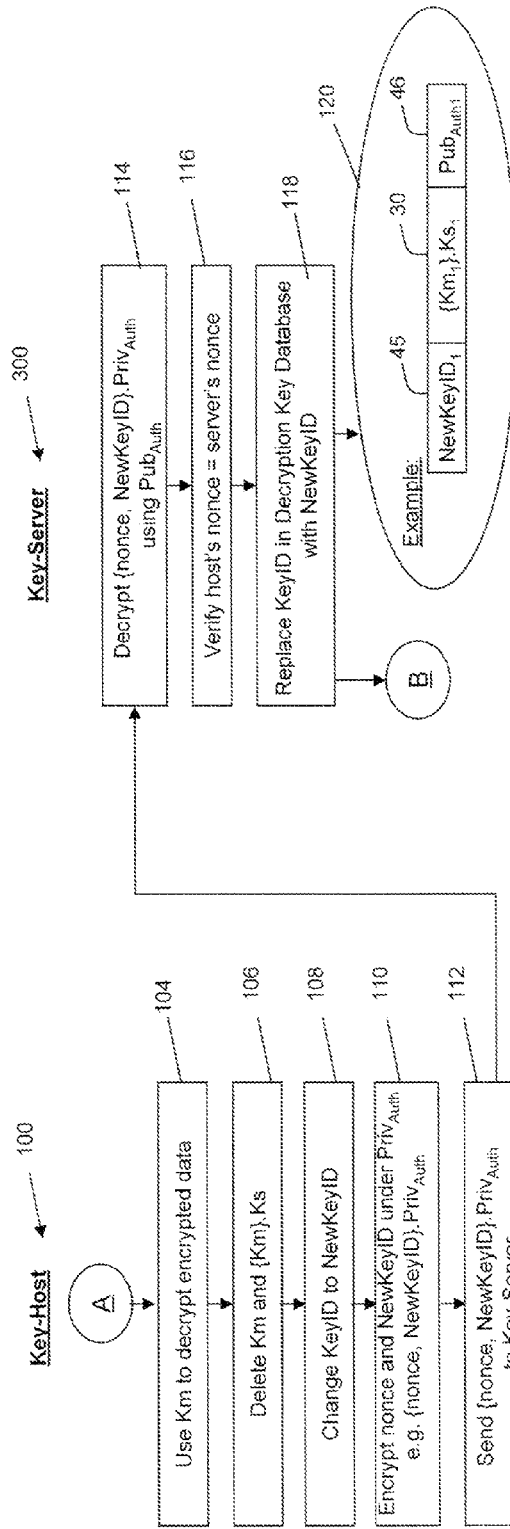
FIG. 7 is a flow diagram illustrating another continued part of the process in FIG. 5 for changing the key ID.

FIG. 7 shows an alternate continuation from block 98 in FIG. 5, wherein an example flow diagram representing example computer executable instructions for changing key IDs is provided. After decrypting the encrypted data (block 104) and deleting the decryption key and encrypted decryption key (block 106), the key-host 100 changes the current key ID to a new key ID, at block 108. The new key ID may be randomly generated or based on any number of factors. At block 110, the key-host 100 encrypts the nonce and new key ID using the private authorization key, as represented by {nonce, NewKeyID}.Priv$_{Auth}$. The key-host 100 sends this data to the key-server 300, at block 112, and then the key-server 300 authenticates {nonce, NewKeyID}.Priv$_{Auth}$ using the public authentication key, at block 114. The key-server 300, at block 116, compares the key-host's nonce with the key-server's nonce, to verify they are the same. If the nonce is verified, then at block 118 the key-server 300 replaces the current key ID in the decryption key database 36 with the new key ID. In one example 120, the new key ID 45 is associated with the corresponding encrypted decryption key 30 and public authentication key 46.

It can be appreciated that changing the key ID deters attackers from locating the correct decryption key for decrypting the encrypted data 20, especially after the decryption key has been used. The key IDs may also be changed after every retrieval of a decryption key, which would ensure transactional atomicity is enforced. In other words, the retrieval and deletion of a decryption key by the key-host 100 is considered to be a discrete unit, wherein all blocks within the unit must be completed.

Figure 8:
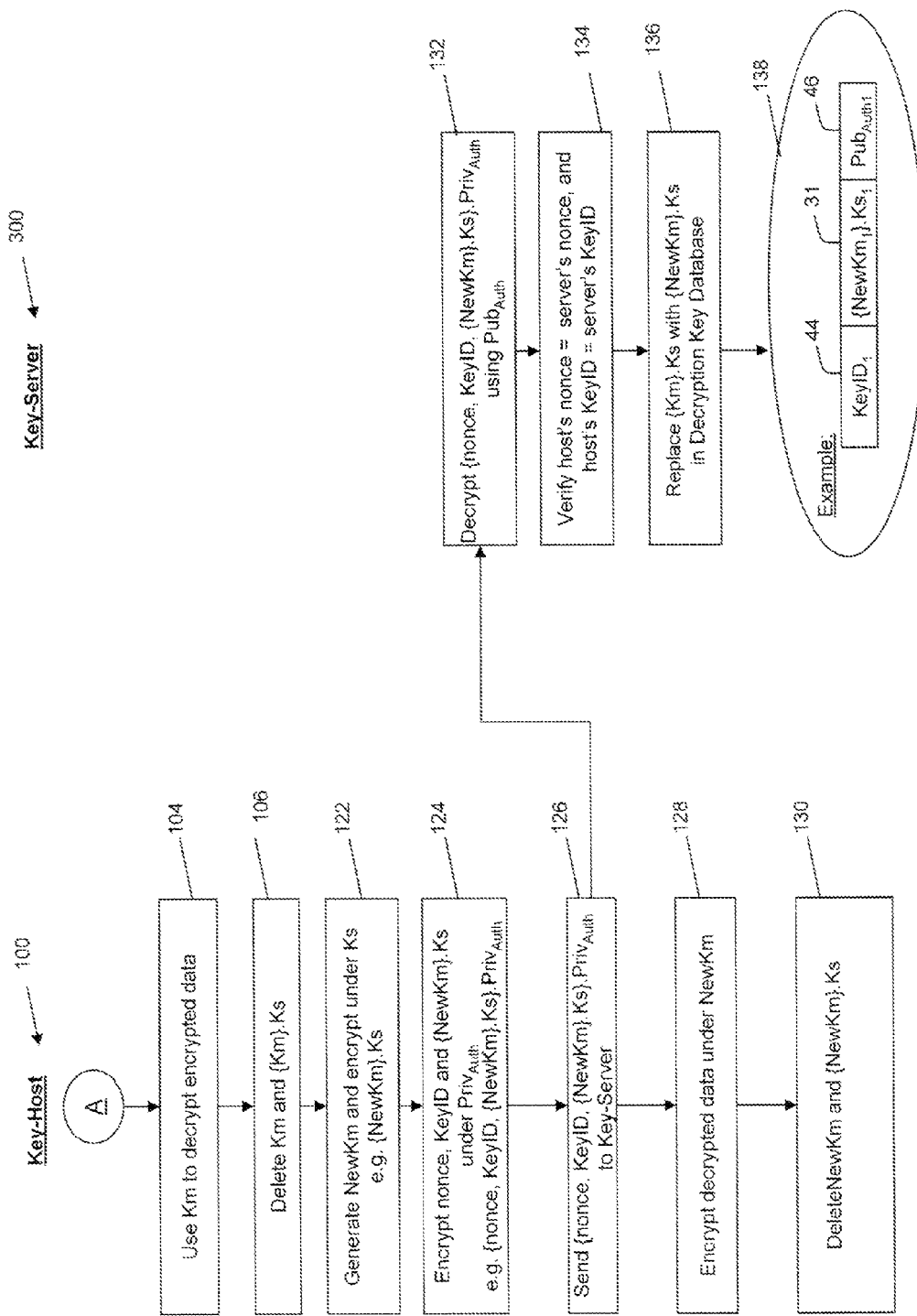
FIG. 8 is a flow diagram illustrating another continued part of the process in FIG. 5 for changing the decryption key.

Turning to FIG. 8, an alternate continuation from block 98 in FIG. 5 is shown, wherein a method for changing the decryption key is provided. After decrypting the encrypted data (block 104) and deleting the decryption key and encrypted decryption key (block 106), the key-host 100 generates a new decryption key and encrypts the new decryption key under the storage key, as represented by {NewKm}.Ks, as per block 122. Then, at block 124, the key-host 100 signs the nonce, key ID and encrypted new decryption key using the private authentication key. This data is represented by {nonce, KeyID, {NewKm}.Ks}.Priv$_{Auth}$ and is sent to the key-server 300, at block 126. The key-host 100 then proceeds to encrypt the data 20 using the new decryption key (block 128) and deletes the decryption key and encrypted decryption key from its memory (block 130) thereafter.

Also in continuation to block 126, after the key-server 300 receives the data, the key-server 300 authenticates {nonce, KeyID, {NewKm}.Ks}.Priv$_{Auth}$ using the public authentication key (block 132). If authenticated, then at block 134, the key-server 300 verifies the nonce and key ID. If the nonce and key ID are verified, then the current encrypted decryption key in the decryption key database 36 is replaced with the encrypted new decryption key. As shown in one example 138, the encrypted new decryption key 31 is stored in the database 36 in association with the corresponding key ID 44 and public authentication key 46.

Figure 9:
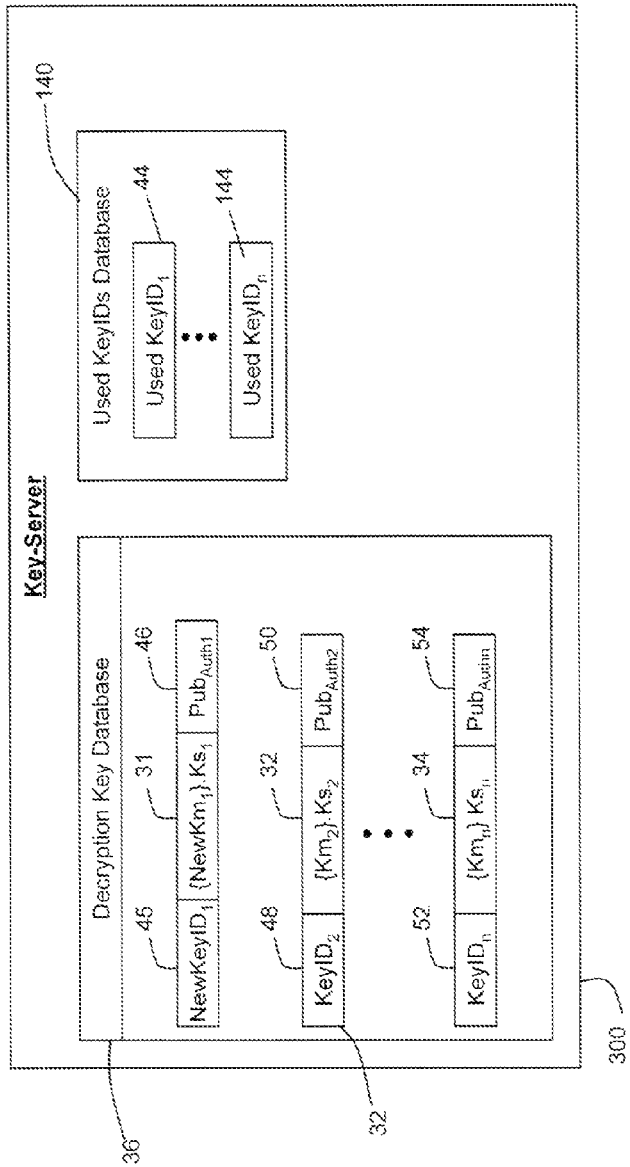
FIG. 9 is a block diagram of a key server in isolation showing example components therein.

Changing the decryption key deters an attacker from decrypting the encrypted data 20, especially in the situation where a current decryption key has been compromised. It can also be appreciated that both the decryption key and key ID may be changed together by combining the operations described in the above blocks. FIG. 9, for example, shows a new key ID 45 and an encrypted new decryption key 31 in the decryption key database 36. In yet another approach, the encrypted new decryption key and corresponding public authentication key and key ID are stored on a different key-server 300, thereby making it difficult for an attacker to locate the decryption key.

Figure 10:
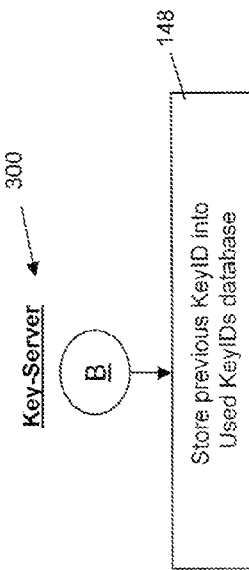
FIG. 10 is a flow diagram illustrating a continued part of the process in FIG. 7 for storing previous used key IDs.

Also shown in FIG. 9 is a used key IDs database 140, which stores previous or used key IDs that have been replaced. For example, turning to FIG. 10, after NewKeyID$_1$ replaces KeyID$_1$, then the key-server 300 stores KeyID$_1$ in the used key IDs database 140 (block 148). A number of used key IDs 44, 144 are stored in the database 140.

Figure 11:
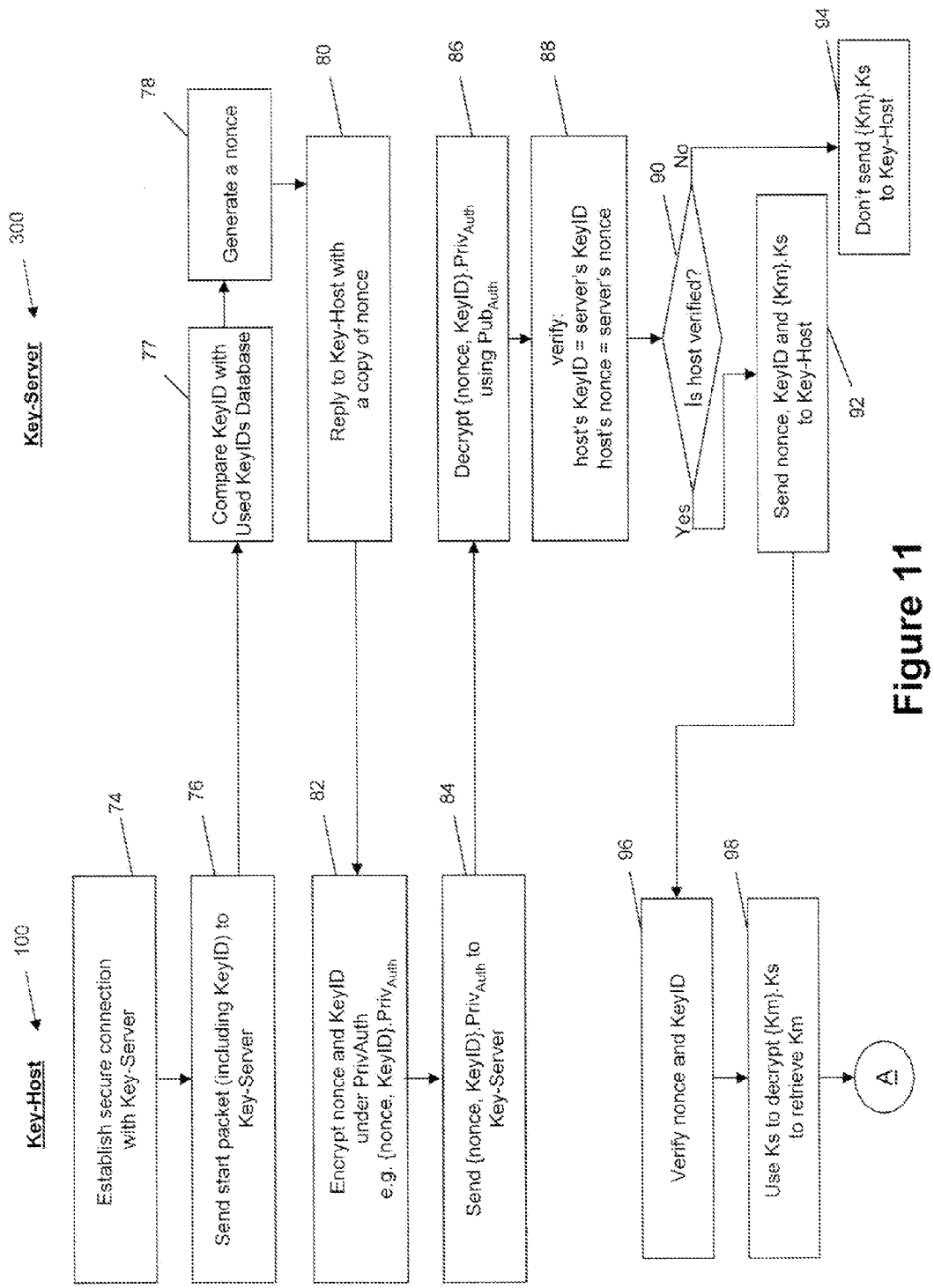
FIG. 11 is a flow diagram illustrating another process for a key-host retrieving a decryption key from a key-server, including comparing a key ID.
Figure 12:
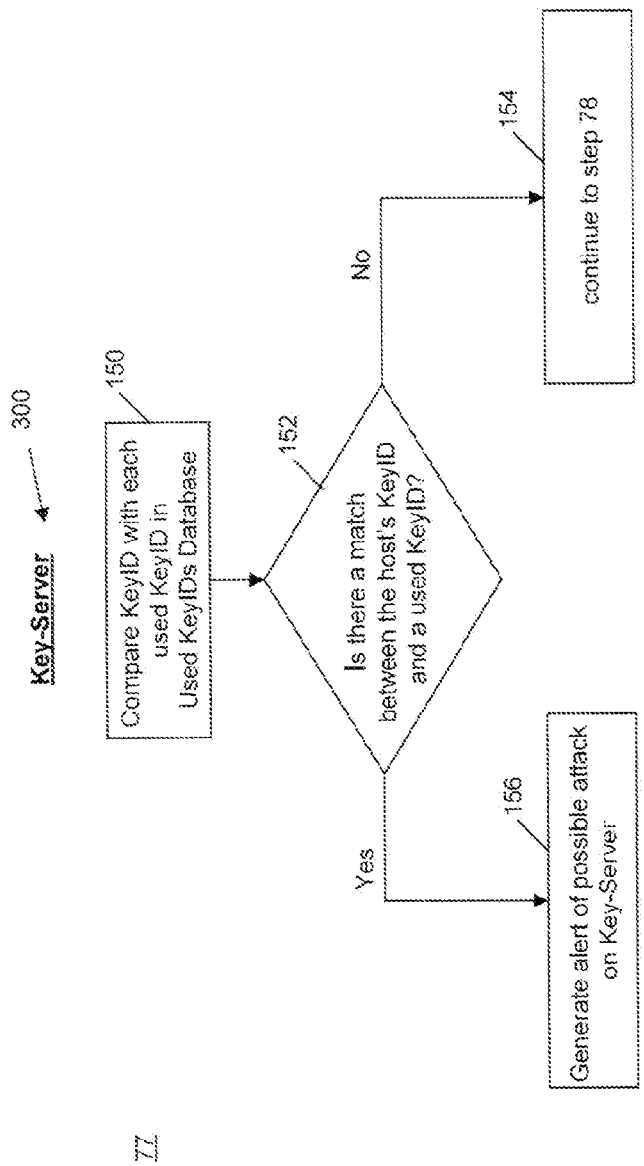
FIG. 12 is a flow diagram illustrating a process for comparing a key ID, as shown in FIG. 11.

Storing the used key IDs can be used as a method for detecting a possible attack. For example, FIG. 11 shows an example flow diagram representing example computer executable instructions for retrieving a decryption key, wherein the key-host 100 sends a key ID to the key-server 300 at block 76. At block 77, the key-server 300 compares the received key ID with the used key IDs database 140. As can be best seen in FIG. 12, the received key ID is compared with each of the used key IDs in the database 140 (block 150). At block 152, the key-server determines if a match has been found for the received key ID. If there is no match (block 154), then the key-server 300 proceeds to generate a nonce at block 78. However, if there is a match between the received key ID and a used key ID, then a warning regarding the key-host 100 is generated (block 156). It can be understood that an authentic key-host 100 would have the most up-to-date or recent version of the key ID. By comparison, a computing device that claims to be a key-host, which provides an out-dated or used key ID would likely be an attacker. Therefore, the key-server 300 can use the stored used key IDs for comparison to identify a possible attack. In an example embodiment, after identifying a computing device as an attacker, the computing device is denied access to the key-server 300.

It can be appreciated that the principles of storing key IDs, as discussed with respect to FIGS. 9, 10, 11 and 12, may also be applied to storing used decryption keys Km. In other words, if a used or out-dated decryption key Km is sent to the key-server 300, then a possible attack is identified and the attacker is denied access to the key-server 300.

Figure 13:
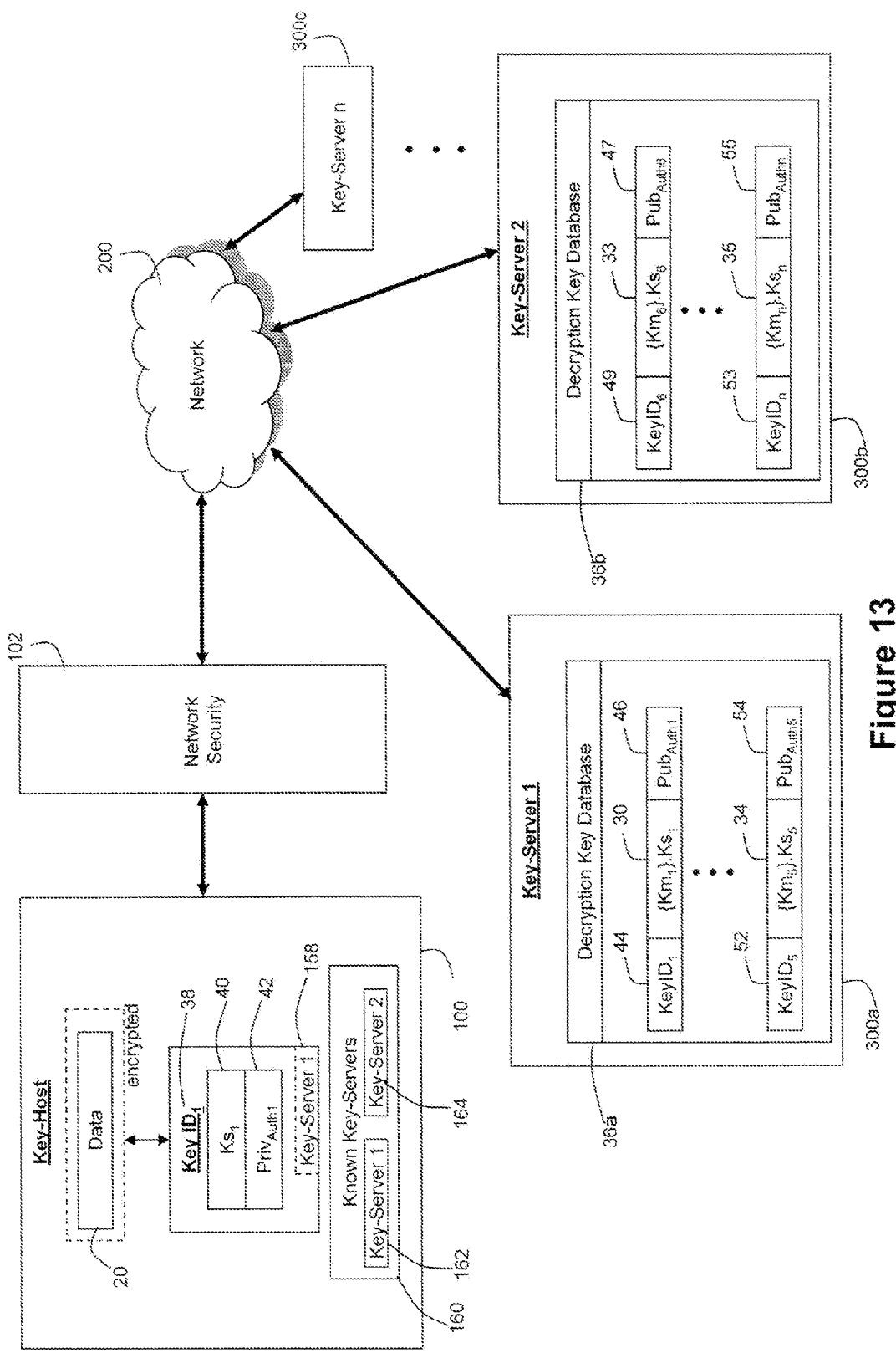
FIG. 13 is a schematic block diagram of a key-host in communication with known and unknown key-servers.

Turning to FIG. 13, another example configuration of a key-host 100 and multiple key-servers 300a, 300b, 300c is provided. As can be seen, the decryption key database 36a in key-server1 300a holds different encrypted decryption keys 30, 34 from those keys 33, 35 in the decryption key database 36b in key-server2 300b. The key-host 100 may, for example, know beforehand which of the key-servers is storing the desired decryption key. In particular, key $ID_1$ 38, $Ks_1$ 40 and $Priv_{Auth1}$ 42 are associated with each other as they correspond to a particular decryption key $Km_1$. In addition, this association includes a key-server tag 158 that is used to identify which key-server 300 stores the particular decryption key. For example, the tag 158 identifies that the decryption key associated with key $ID_1$ 38 is stored in key-server1 300a. Thus, based on the tag 158, the key-host 100 contacts key-server1 300a to retrieve the encrypted decryption key 30.

The key-host 100 may also have a list 160 of known key-servers 162, 164 that may or may not hold the desired decryption keys. If for example, the encrypted data 20 does not have an associated key-server tag 158, then the key-host 100 contacts all the known key-servers in the list 160 with a request for the decryption key corresponding to a given key ID.

In some cases, the known key-servers in the list 160 do not contain the requested decryption key. If so, then the key-host 100 broadcasts the request across the network 200 to all known and unknown key-servers 300. The key-servers 300 actively listen for broadcasts or specific connection requests from key-hosts 100. If a broadcast or connection request is found relevant, then a communication session may be established.

Figure 14:
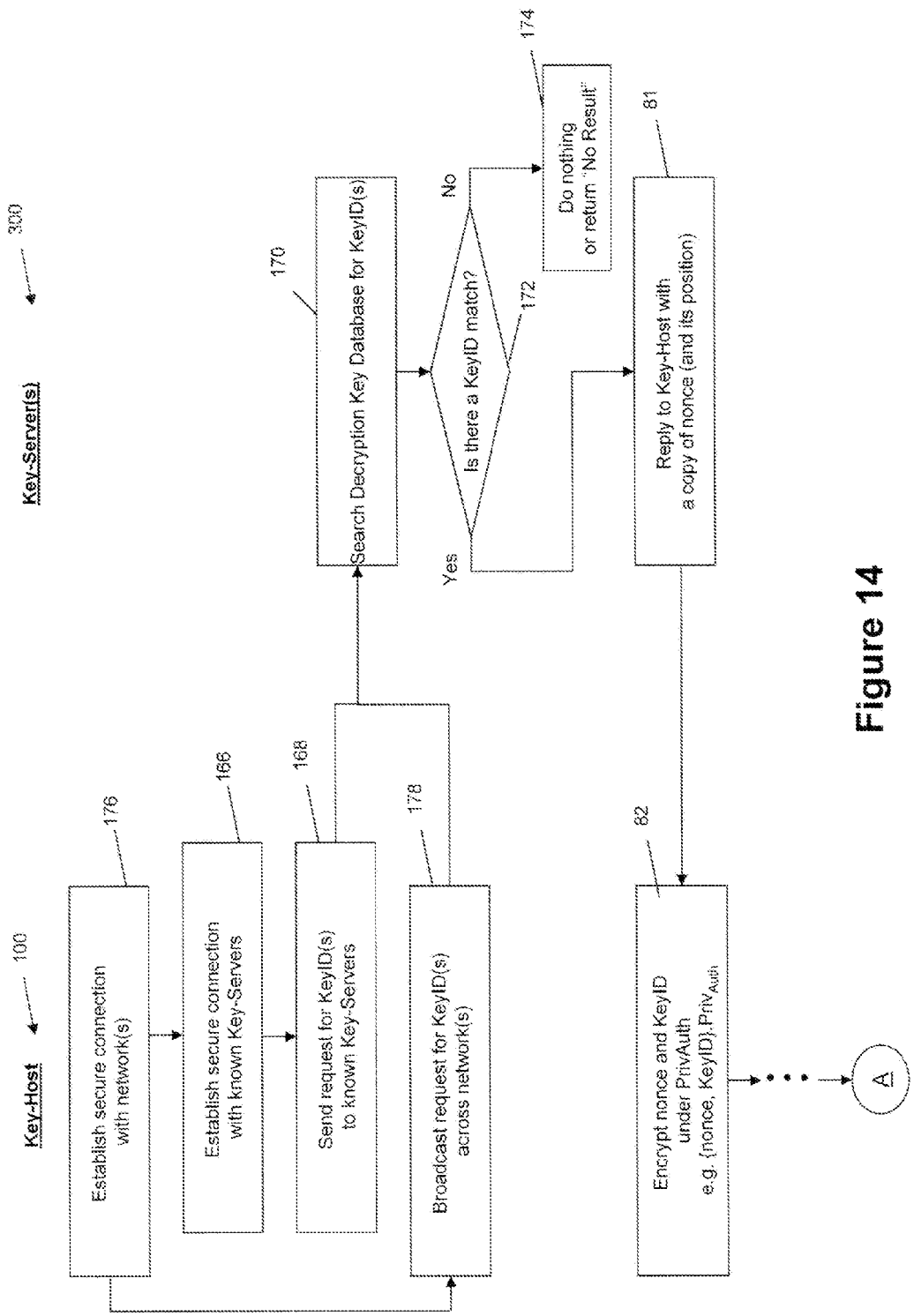
FIG. 14 is a flow diagram of a process for a key-host establishing a connection with a key-server.

In FIG. 14, an example flow diagram representing computer executable instructions for a key-host 100 connecting with a key-server 300 is provided. At block 176, the key-host 100 establishes a secure connection with one more networks 200, wherein the conditions or requirements of the network security 102 must be met. If one or more key-servers 300 are known, then the key-host 300 establishes a secure connection with the known key-servers 300 (block 166) and then sends a request to the key-servers 300 for a particular key ID (block 168). Alternatively, after establishing a secure connection with the networks 200, the key-host 300 broadcasts the request for a particular key ID across the networks (block 178). At block 170, each of the key-servers 300, either known or unknown, search their respective decryption key database 36 for a key ID. Although not shown, it can be appreciated that the key-server 300 may at this time also employ block 77 to compare the requested key ID with the used key IDs database 140. If the key-server 300 does not match the requested key ID with those in the decryption key database 36 (block 172), then the key-server 300 may do nothing or respond to the key-host 100 indicating no match was found (block 174). However, if the key-server 300 does identify a key ID match (block 172), then the key-server 300 replies to the key-host 100 with an indication that there is a match (block 81). The key-server 300 may also include in the reply a copy of a nonce and its position (e.g. internet protocol address). As discussed above, after receipt at block 82 the key-host 100 cryptographically signs the nonce and key ID using the private authentication key, wherein the signed data is represented by {nonce, key ID}.$Priv_{Auth}$. The method for a key-host 100 to retrieve a decryption key from a key-server 300 then proceeds.

Figure 15:
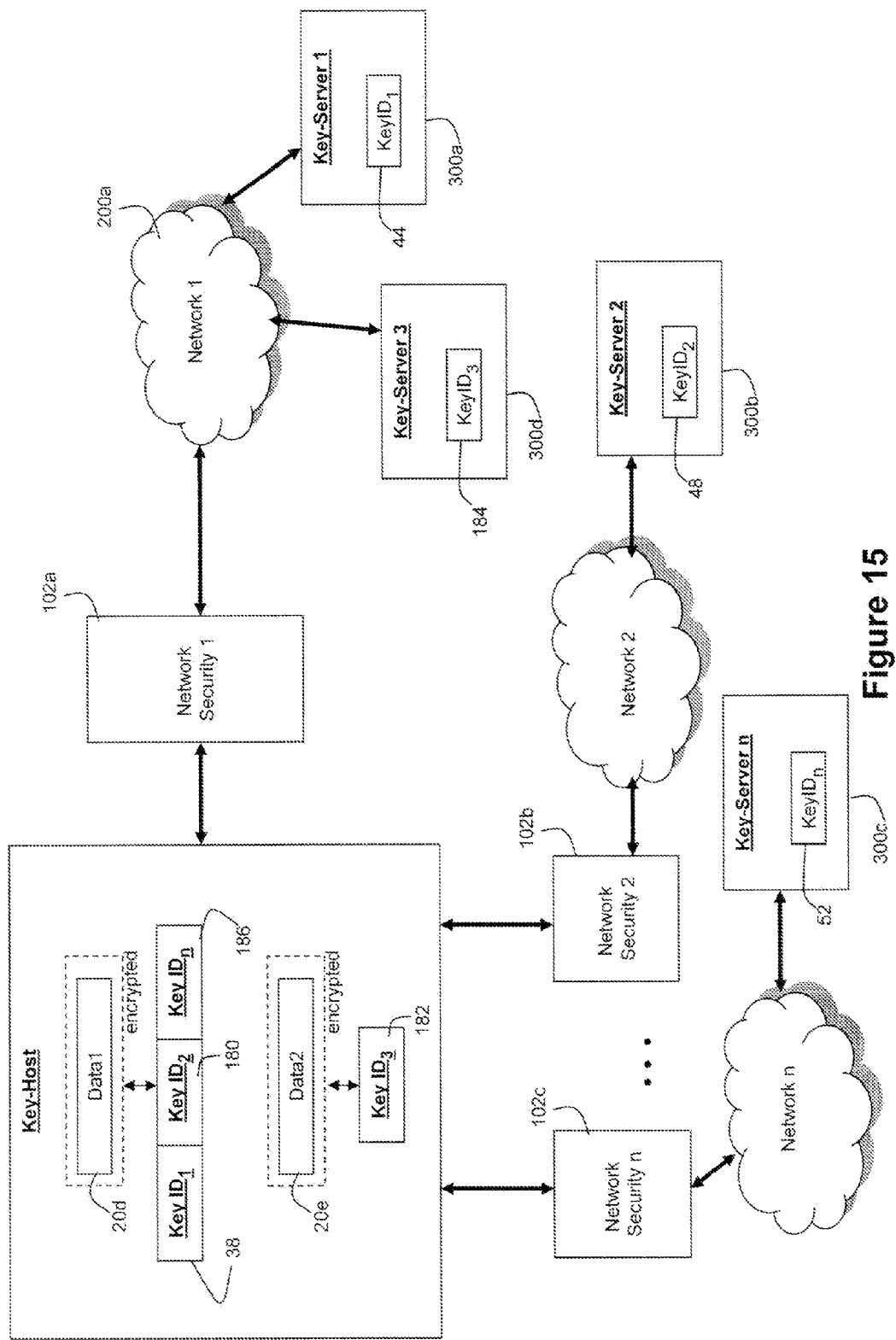
FIG. 15 is a schematic block diagram of a key-host in communication with several key-servers through several networks.

Turning to FIG. 15, another example configuration between a key-host 100, multiple networks 200 and multiple key-servers 300 is provided. Data1 20d is encrypted in such a way that multiple decryption keys are required to decrypt data1 20d. For example, the decryption keys corresponding to key $ID_1$ 38, key $ID_2$ 180 and key $ID_n$ 186 are required to decrypt data1 20d. Data2 20e may, for example, be encrypted in such a way that it can be decrypted with a single decryption key corresponding to key $ID_3$ 182. As can be seen, the key IDs are stored in different key-servers 300, which can be part of separate networks 200. The server's copy of key ID1 44 as well as the corresponding encrypted decryption key are stored on key-server1 300a. Similarly, the server's copies of key $ID_2$ 48, key $ID_3$ 184 and key $ID_n$ 52 are stored on key-server2 300b, key-server3 300d and key-servern 300c, respectively. In order for the key-host 100 to access key-server1 300a and key-server3 300d, the key-host 100 must meet the conditions or requirements of network security1 102a, since both key-servers 300a, 300d are part of network1 200a. Similarly, the key-host 100 must meet the conditions and requirements of network security2 102b in order to connect with network2 200b, thereby having allowing for communication with key-server2 300b. The same relationship exists between the key-host 100, network securityn 102c, networkn 200c and key-servern 300c.

Separation of the encrypted decryption keys across multiple key-servers 300 and multiple networks 200 advantageously decreases the dependency on the security of a particular key-server 300. In particular, should one key-server 300 be compromised, the other key-servers 300 are not affected. Similarly, should one network 200 be compromised, the other networks 200 and their corresponding key-servers 300 are not affected. For example, an attacker has stolen the key-host 100 containing data1 20d and data2 20e and has further gained access to network1 200a. Thus, the attacker may be able to decrypt encrypted data2 20e since encrypted data2 20e can be decrypted with the decryption key corresponding to key $ID_3$ 184, and the attacker has access to that decryption key in key-server3 300d via network1 200a. However, for the attacker to decrypt encrypted data1 20d, the attacker would need keys corresponding to key $ID_1$ 38, key $ID_2$ 180 and key $ID_n$ 186. However, decryption keys with key $ID_2$ 180 and key $ID_n$ 186 are only accessible through other networks 200b, 200c. The attacker cannot retrieve decryption keys with key $ID_2$ 180 and key $ID_n$ 186 because the attacker cannot penetrate network security2 102b and network securityn 102c in order to connect with network2 200b and networkn 200c, respectively. Thus, the attacker would not be able to decrypt data1 20d.

In another example approach, data 20 may be encrypted in such a way that n decryption keys are generated for decrypting the data 20. However, not all n keys may be required to decrypt the encrypted data 20, so only a subset of m keys is required instead, where m<n. Non-limiting examples of such an approach are threshold schemes, including Shamir's threshold scheme. Applying this m of n keys approach allows the encrypted data 20 to be decrypted if the key-host 100 retrieves m decryption keys from the key-servers 300. Thus, if one or more decryption keys are unavailable and cannot be retrieved, the encrypted data 20 may still be decrypted. It is intended that any method of decrypting data using a subset of decryption keys that is compatible with the present disclosure may be used here, including those that may be known but not listed to a person of skill in this art who has the benefit of the present disclosure.

For example, in FIG. 15, data1 20d may be encrypted using an m of n approach where any two of the three decryption keys must be retrieved to decrypt data1 20d. Continuing the example, an attacker steals key-server2 300b, which stores the decryption key with key $ID_2$, to prevent any key-host 100 that relies on the decryption key with key $ID_2$ 48 from decrypting the encrypted data 20. However, despite the decryption key with key $ID_2$ 180 being unavailable, the key-host 100 requires only any two keys, such as those distributed over key-server1 300a and key-servern 300c. The key-servers 300a, 300c in this example have not been compromised by the attacker, and thus, the two keys are available. Therefore, the key-host 100 is able to retrieve the two decryption keys with key $ID_1$ and key $ID_n$, thereby meeting the requirements of the m of n keys scheme for decrypting data1 20d.

It some situations it is desirable to change the decryption keys associated with data 20 periodically for increased security. This would involve encrypting or re-encrypting the data 20 at predetermined or random time intervals, such that the encrypted data 20 could only be decrypted using the most up-to-date or recent decryption key or keys. This has particular utility for battery-powered devices because of the associated mobility. For example, a device (e.g. a key-host 100) may have data that is decrypted using a certain decryption key. During this state, if the device is compromised, e.g. stolen by an attacker, then the attacker would have access to the decrypted data. However, by encrypting or re-encrypting the data 20 at predetermined or random time intervals using different decryption key or keys, then the attacker would not be able to access the data 20 again, once the attacker has lost connection with network security 102. Examples of battery-powered devices include mobile devices 100a, tablets, netbooks, laptops 100c and machines powered by uninterruptible power supplies. As can be readily understood, the process for re-encrypting the data 20 and changing the decryption key, also called remounting, employs similar blocks as described above with reference to FIG. 8. With each remounting, the new decryption key may also be provided with a new key ID and may be relocated to a different key-server 300. It is noted that a frequent exchange of data between the key-host 100 and key-servers 300 may provide over time sufficient information to an attacker. With this information, it is possible that an attacker could launch an attack vector by forcing a large number communication sessions to occur and using these for cryptographic attacks. To mitigate this possibility, the key-server 300 enforces a minimum time period between each consecutive key-retrieval session. The key-server 300 also enforces a maximum number of key-retrieval sessions with a key-host 100 in a given time period.

Examples of specific applications include mobile devices 100a that will not activate or boot-up unless connected to a certain network 200 to retrieve the required decryption key or keys. In another example, a mobile device 100a captures and store photographs. These photographs may be encrypted immediately thereafter, with the decryption key stored on a home computer (e.g. key-server 300), accessible only through a local home network 200. Thus, the photos advantageously cannot be viewed unless the mobile device 100a is in the home environment (e.g. network security 102) and is connected to the local home network 200. This protects the privacy of the photos based on the location of the mobile device 100a with respect to the location of the local home network 200. In yet another example, a mobile device 100a may receive e-mails related to work. Certain of these work e-mails are sensitive, for example as identified by subject or sender, and may be automatically encrypted. The decryption key is then sent to secure work key-server 300, which is only accessible by physically being located in the work building (e.g. network security 102). Thus, the encrypted work e-mails can only be decrypted and viewed when the mobile device 100a is located in the work building.

The operations in the flow charts described herein are just for example. There may be many variations to these operations without departing from the spirit of the principles described herein. For instance, the operations may be performed in a differing order, or operations may be added, deleted, or modified.

Although the above has been described with reference to certain specific embodiments, various modifications thereof will be apparent to those skilled in the art as outlined in the appended claims.

The invention claimed is:

1. A non-transitory computer readable medium on a device for encrypting and decrypting data, the computer readable medium comprising computer executable instructions being capable of:

encrypting data stored on the device, the encrypted data capable of being decrypted with a decryption key stored on the device;

encrypting the decryption key, the encrypted decryption key capable of being decrypted with a storage key, the storage key stored on the device;

transmitting the encrypted decryption key from the device, the transmission configured to be receivable by a key-server for storage;

deleting the encrypted decryption key and the decryption key from the device;

generating position information, wherein the position information describes the physical position of the device;

transmitting a digital signature to the key-server, wherein the position information is part of the digital signature;

retrieving the encrypted decryption key from a received transmission from the key-server;

decrypting the encrypted decryption key using the storage key to obtain the decryption key; and using the decryption key for decrypting the encrypted data.

2. The non-transitory computer readable medium of claim 1, wherein the device is in communication with the key-server via a network security system.

3. The non-transitory computer readable medium of claim 1 further comprising instructions capable of generating a key ID in association with the decryption key and the storage key, the key ID transmitted to the key-server along with the encrypted decryption key.

4. The non-transitory computer readable medium of claim 1 further comprising instructions capable of generating a key ID, a private authentication key, and a public authentication key, wherein the key ID and the public authentication key are transmitted to the key-server along with the encrypted decryption key.

5. The non-transitory computer readable medium of claim 4 further comprising instructions capable of:
  establishing a secure connection with the key-server;
  receiving a nonce from the key-server;
  encrypting the nonce and the key ID using the private key, and the device transmitting the encrypted nonce and key ID in a transmission configured to be receivable by the key-server as a request for the encrypted storage key; and
  the device receiving a next transmission from the key-server, the next transmission indicating the key-server verified the request.

6. The non-transitory computer readable medium of claim 1 further comprising instructions capable of:
  after using the decryption key to decrypt the encrypted data, deleting the decryption key and the encrypted decryption key.

7. The non-transitory computer readable medium of claim 6 further comprising instructions capable of:
  after deleting the decryption key and the encrypted decryption key, generating a new decryption key;
  encrypting the new decryption key, the encrypted new decryption key able to be decrypted with the storage key;
  transmitting the encrypted new decryption key from said device in a transmission configured to be receivable by said key-server for storage; and
  after re-encrypting the data, the re-encrypted data capable of being decrypted using the new decryption key, deleting the encrypted decryption key and the decryption key from the device.

8. The non-transitory computer readable medium of claim 6 further comprising instructions capable of:
  at periodic times, generating a new decryption key;
  re-encrypting the data, the re-encrypted data capable of being decrypted with the new decryption key;
  encrypting the new decryption key, the encrypted new decryption key capable of being decrypted with the storage key;
  transmitting the encrypted decryption key from the device to the key-server; and
  deleting the new decryption key and the encrypted decryption key from the device.

9. The non-transitory computer readable medium of claim 1 wherein the encrypted data is capable of being decrypted with multiple decryption keys stored on the device, the computer readable medium further comprising computer executable instructions capable of:
  encrypting the multiple decryption keys, the multiple encrypted decryption keys capable of being decrypted with corresponding multiple storage keys, the multiple storage keys stored on the device;
  transmitting the multiple encrypted decryption keys from the device, the transmission configured to be receivable by multiple key-servers for storage;
  deleting the multiple encrypted decryption keys and the multiple decryption keys from the device;
  transmitting the digital signature to the multiple key servers;
  retrieving the multiple encrypted decryption keys from a received transmission from each of the multiple key-servers;
  decrypting the multiple encrypted decryption keys using the multiple storage keys to obtain the multiple decryption keys; and
  using the multiple decryption keys for decrypting the encrypted data.

10. The non-transitory computer readable medium of claim 9 further comprising computer executable instructions capable of generating multiple key-server tags, each one of the multiple key-server tags in association with one of the multiple decryption keys and one of the multiple storage keys, each one of the multiple key-server tags used to identify which one of the multiple key-servers stores a particular decryption key.

11. The non-transitory computer readable medium of claim 10 further comprising computer executable instructions capable of using the multiple key-server tags to contact the multiple key-servers to retrieve the multiple encrypted decryption keys.

12. A method of encrypting and decrypting data on a device, the method comprising:
  encrypting data stored on the device, the encrypted data capable of being decrypted with a decryption key stored on the device;
  encrypting the decryption key, the encrypted decryption key capable of being decrypted with a storage key, the storage key stored on the device;
  transmitting the encrypted decryption key from the device, the transmission configured to be receivable by a key-server for storage;
  deleting the encrypted decryption key and the decryption key from the device;
  generating position information, wherein the position information describes the physical position of the device;
  transmitting a digital signature to the key-server, wherein the position information is part of the digital signature;
  retrieving the encrypted decryption key from a received transmission from the key-server;
  decrypting the encrypted decryption key using the storage key to obtain the decryption key; and
  using the decryption key for decrypting the encrypted data.

13. The method of claim 12, wherein the device is in communication with the key-server via a network security system.

14. The method of claim 12 further comprising the device generating a key ID in association with the decryption key and the storage key, the key ID transmitted to the key-server along with the encrypted decryption key.

15. The method of claim 12 further comprising the device generating a key ID, a private authentication key, and a public authentication key, wherein the key ID and the public authentication key are transmitted to the key-server along with the encrypted decryption key.

16. The method of claim 15 further comprising:
  the device establishing a secure connection with the key-server;
  the device receiving a nonce from the key-server;
  encrypting the nonce and the key ID using the private key, and the device transmitting the encrypted nonce and key ID in a transmission configured to be receivable by the key-server as a request for the encrypted storage key; and the device receiving a next transmission from the key-server, the next transmission indicating the key-server verified the request.

17. The method of claim 12 further comprising:
after the device uses the decryption key to decrypt the encrypted data, deleting the decryption key and the encrypted decryption key.

18. The method of claim 17 further comprising:
after the device deleting the decryption key and the encrypted decryption key, generating a new decryption key;
encrypting the new decryption key, the encrypted new decryption key capable of being decrypted with the storage key;
transmitting the encrypted new decryption key from said device in a transmission configured to be receivable by said key-server for storage; and
after re-encrypting the data, the re-encrypted data capable of being decrypted using the new decryption key, deleting the encrypted decryption key and the decryption key from the device.

19. The method of claim 17 further comprising:
at periodic times, the device generating a new decryption key;
re-encrypting the data, the re-encrypted data capable of being decrypted with the new decryption key;
encrypting the new decryption key, the encrypted new decryption key capable of being decrypted with the storage key;
transmitting the encrypted decryption key from the device to the key-server; and
deleting the new decryption key and the encrypted decryption key from the device.

20. The method of claim 12 wherein the encrypted data is capable of being decrypted with multiple decryption keys stored on the device, the method further comprising:
encrypting the multiple decryption keys, the multiple encrypted decryption keys capable of being decrypted with corresponding multiple storage keys, the multiple storage keys stored on the device;
transmitting the multiple encrypted decryption keys from the device, the transmission configured to be receivable by multiple key-servers for storage;
deleting the multiple encrypted decryption keys and the multiple decryption keys from the device;
transmitting the digital signature to the multiple key-servers;
retrieving the multiple encrypted decryption keys from a received transmission from each of the multiple key-servers;
decrypting the multiple encrypted decryption keys using the multiple storage keys to obtain the multiple decryption keys; and
using the multiple decryption keys for decrypting the encrypted data.

21. The method of claim 20 further comprising the device generating multiple key-server tags, each one of the multiple key-server tags in association with one of the multiple decryption keys and one of the multiple storage keys, each one of the multiple key-server tags used to identify which one of the multiple key-servers stores a particular decryption key.

22. The method of claim 21 further comprising using the multiple key-server tags to contact the multiple key-servers to retrieve the multiple encrypted decryption keys.

23. A system for providing a cryptographic key, the system comprising:
a first computing device having a first processor for:
generating a decryption key;
encrypting the decryption key to be decrypted with a storage key;
generating position information, wherein the position information describes the physical position of the first computing device and the position information is part of a digital signature;
the first computing device also having a first memory for storing the storage key as well as a key ID and a private authentication key associated with the decryption key; and
a second computing device in communication with the first computing device, the second computing device having a second memory for storing the encrypted decryption key, a copy of the key ID and a public authentication key corresponding to the private authentication key, the second computing device also having a second processor for authenticating the first computing device using the authentication keys before transmitting the encrypted decryption key to said first computing device.

24. The system in claim 23 wherein the first computing device comprises a mobile device and the second computing device comprises a server.

25. A non-transitory computer readable medium on a key-server for storing encrypted decryption keys, the computer readable medium comprising instructions capable of:
receiving in a first reception, a first key ID, a public authentication key and an encrypted decryption key capable of being decrypted from a storage key, the first reception configured to be transmittable by a key-host;
storing the first key ID, the public authentication key and the encrypted decryption key in association with one another;
receiving position information, wherein the position information describes the physical position of the key-host;
when the position information is outside a particular area, denying the key-host access to the key-server; and
when the position information is within the particular area:
receiving a request from a received transmission from the key-host to obtain the encrypted decryption key;
generating and transmitting a first nonce, the first nonce configured to be transmittable to the key-host;
receiving in a second reception, an encryption of a second nonce and a second key ID, the reception configured to be transmittable by the key-host, the encryption performed using a private authentication key corresponding to the public authentication key;
decrypting the encryption using the public authentication key;
verifying that the second key ID matches the first key ID and the second nonce matches the first nonce; and
transmitting the encrypted decryption key to the key-host.

26. A method of storing encrypted decryption keys on a key-server, the method comprising:
the key-server receiving in a first reception, a first key ID, a public authentication key and an encrypted decryption key capable of being decrypted from a storage key, the first reception configured to be transmittable by a key-host;
the key-server storing the first key ID, the public authentication key and the encrypted decryption key in association with one another;
the key-server receiving position information, wherein the position information describes the physical position of the key-host;

when the position information is outside a particular area, the key-server denying the key-host access to the key-server; and when the position information is within the particular area:
the key-server receiving a request from a received transmission from the key-host to obtain the encrypted decryption key;
the key-server generating and transmitting a first nonce, the first nonce configured to be transmittable to the key-host;
the key-server receiving in a second reception, an encryption of a second nonce and a second key ID, the reception configured to be transmittable by the key-host, the encryption performed using a private authentication key corresponding to the public authentication key;
the key-server decrypting the encryption using the public authentication key;
the key-server verifying that the second key ID matches the first key ID and the second nonce matches the first nonce; and
the key-server transmitting the encrypted decryption key to the key-host.

\* \* \* \* \*

UNITED STATES PATENT AND TRADEMARK OFFICE
CERTIFICATE OF CORRECTION

PATENT NO. : 8,639,928 B2  
APPLICATION NO. : 13/311238  
DATED : January 28, 2014  
INVENTOR(S) : Michael Hingston McLaughlin Bursell Page 1 of 1

It is certified that error appears in the above-identified patent and that said Letters Patent is hereby corrected as shown below:

In the Specification

Column 12, line 36 reads, "300b, key-server3 300d and key-servern 300c, respectively."  
should read  
-- 300b, key-server3 300d and key-server n 300c, respectively. --.

Column 12, line 45 reads, "host 100, network securityn 102c, networkn 200c and key-"  
should read  
-- host 100, network security n 102c, network n 200c and key- --.

Column 12, line 46 reads, "servern 300c."  
should read  
-- server n 300c. --.

Column 13, line 1 reads, "rityn 102c in order to connect with network2 200b and net-"  
should read  
-- rity n 102c in order to connect with network2 200b and net- --.

Column 13, line 2 reads, "workn 200c, respectively. Thus, the attacker would not be"  
should read  
-- work n 200c, respectively. Thus, the attacker would not be --.

Column 13, line 30 reads, "over key-server1 300a and key-servern 300c. The key-servers"  
should read  
-- over key-server1 300a and key-server n 300c. The key-servers --.

Signed and Sealed this  
Eighteenth Day of November, 2014

Michelle K. Lee  
*Deputy Director of the United States Patent and Trademark Office*